United States Patent [19]

Carson

[11] Patent Number: 4,824,562

[45] Date of Patent: Apr. 25, 1989

[54] IN WELL SEPARATOR FOR HEAVIER LIQUID

[75] Inventor: Glenn S. Carson, Mechanicsburg, Pa.

[73] Assignee: R. E. Wright Associates, Inc., Middletown, Pa.

[21] Appl. No.: 25,068

[22] Filed: Mar. 12, 1987

[51] Int. Cl.⁴ .......................................... E21B 43/38
[52] U.S. Cl. ................... 210/104; 210/115; 210/117; 210/170; 166/265
[58] Field of Search ............... 210/921, 923, 97, 98, 210/104, 109, 115, 117, 136, 170; 417/113, 118, 138, 143, 36; 166/53, 65.1, 107, 265, 369

[56] References Cited

U.S. PATENT DOCUMENTS

| | | | |
|---|---|---|---|
| 3,893,918 | 7/1975 | Favret, Jr. | 210/84 |
| 3,915,225 | 10/1975 | Swink | 210/104 |
| 4,187,912 | 2/1980 | Cramer | 166/53 |
| 4,273,650 | 6/1981 | Solomon | 210/923 |
| 4,431,534 | 2/1984 | Gordon | 210/923 |
| 4,466,777 | 8/1984 | Kimberlin | 417/36 |
| 4,469,170 | 9/1984 | Farmer, Jr. | 210/923 |
| 4,546,830 | 10/1985 | McLaughlin et al. | 166/53 |
| 4,625,807 | 12/1986 | Harlow | 210/923 |
| 4,663,037 | 5/1987 | Breslin | 210/923 |

*Primary Examiner*—Benoit Castel
*Attorney, Agent, or Firm*—Martin Fruitman

[57] ABSTRACT

An in-well separator and recovery device for liquids which are heavier than water. A closed top container in the well circulates liquid through it, drawing liquid into its lower region and deflecting the liquid downward so that the heavier liquid settles to the bottom of the container from where it is pumped to the surface. Water is pumped from the top of the container directly back into the well. The pumps are controlled by sensing the water to pollution interface in the container and shutting down each pump before it pumps the inappropriate liquid.

3 Claims, 1 Drawing Sheet

U.S. Patent        Apr. 25, 1989        4,824,562
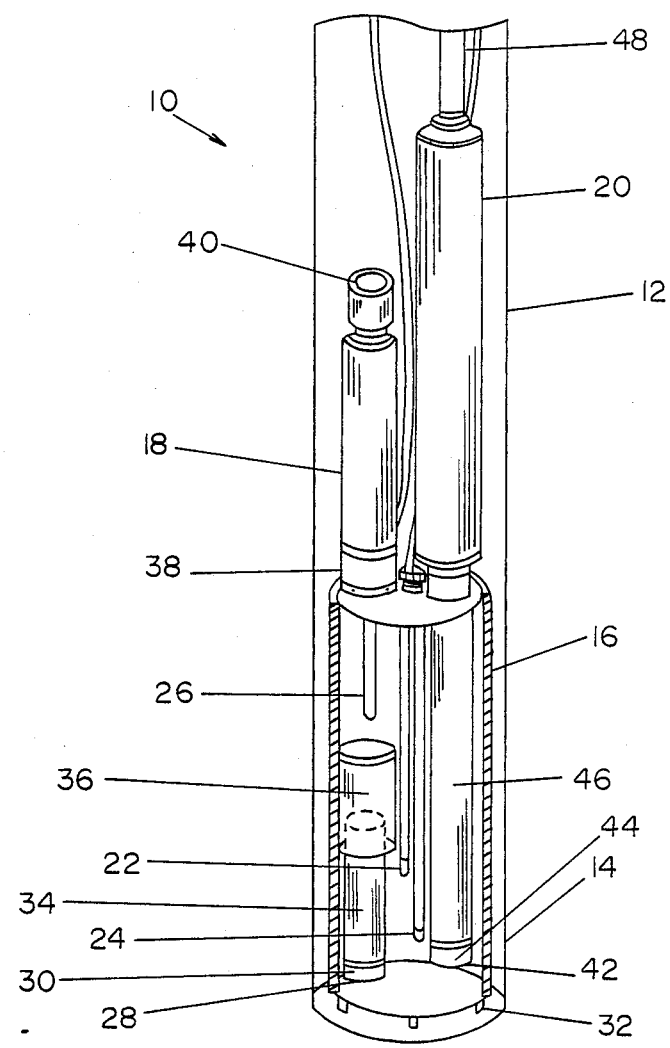

IN WELL SEPARATOR FOR HEAVIER LIQUID

SUMMARY OF THE INVENTION

This invention deals generally with liquid purification and separation and more specifically with an in-well separator to remove only the heavier of two liquids from the well.

Although there is a high degree of public and commercial awareness of the problems caused by and the need to remove pollution from contaminated aquifers, this activity has been largely focused on liquids which are lighter than water. There has been a lack of attention to heavier materials which may be merely the result of these materials being farther from our environment, at the bottom of wells rather than near the top, or it may be a result of the ability to ignore their presence simply by setting a pump intake above the level at which they settle. There is, however, some suspicion that they are being ignored because there is no practical means to separate the heavier liquids except by pumping large quantities of all the liquids from the well and performing the separation above ground.

The present invention approaches the problem from a completely different aspect. It accumulates and separates the heavier-than-water polluting liquids, such as creosote or some cleaning fluids, in the well, and pumps only that pollution out of the well and to the surface. The water in the well is not pumped to the surface, but it is merely recirculated within the well.

This approach yields two dramatic advantages. One is that the power required for the separation and removal is greatly reduced. No water need be pumped against the considerable liquid head of the well, and this advantage increases as the well depth increases.

A second advantage is that the quantity of liquid which must be handled at the surface is greatly reduced. The present invention pumps only the polluting liquid to the surface, so no additional separation equipment is required and the liquid quantity arriving at the surface is so greatly reduced, that it is conceivable to pump directly into barrels or vehicle mounted tanks for ease of removal.

Although only one liquid is lifted above ground the invention does include two pumps. These pumps are associated with a sealed container which is located near the bottom of the well being treated, at which location the heavier liquids accumulate. As with most in-well equipment, the container typically is cylindrical in configuration, but the shape is not critical.

The liquid intake to the in-well container is located near the bottom of the container in order to have the best access to the heavier polluting liquid. This intake feeds into the container through a check valve to prevent reentry of the polluting liquid into the well, and a baffle is used within the container to direct the mixture of entering liquids to the bottom of the container to minimize any tendency of the entering liquid to agitate the liquid already in the container.

Once the liquid mixture is in the container and protected from agitation it tends to separate naturally under the influence of gravity, so that the heavier polluting liquid settles to the bottom of the container while the water accumulates near the top of the container.

The two pumps in the system have their intakes located at opposite regions of the container. The water pump intake is at or near the top of the container while the heavier liquid pump has its intake in the lower region of the container.

The water pump discharge is located within the well just outside the top of the container, while the heavier liquid pump outlet is connected to the surface above the well so that the heavier liquid can be stored or disposed of. In the preferred embodiment, the two pumps are controlled by a pair of conductivity type sensors which are located with one somewhat below the water pump intake and the other somewhat above the heavier liquid pump intake.

In the preferred embodiment the control system operates the pumps alternately with only one operating at a time. The heavier liquid pump is operated from the time both sensors indicate they are in contact with the heavier liquid until the accumulation of that heavier liquid is lowered so that both sensors indicate the presence of water. At that time, the heavier liquid pump is shut down and the water pump is turned on. The water pump then operates until both sensors again indicate the presence of the heavier liquid, at which time the water pump is shut off and the heavier liquid pump started again.

The present invention therefore furnishes a straightforward in-well separator which pumps to the surface only the polluting liquid being disposed of. Moreover, even when not actually removing that polluting liquid, such as when there is insufficient pollutant to activate that pump, the present invention keeps it contained and isolated from the water in the well and thereby assures that it will cause no further environmental damage.

BRIEF DESCRIPTION OF THE DRAWING

The FIGURE depicts the preferred embodiment of the invention in a cut away pictorial view in which the earth surrounding the well is omitted and the separator container is cut away for better viewing.

DETAILED DESCRIPTION OF THE INVENTION

The preferred embodiment of the invention is shown in the FIGURE in which the earth around the separator is omitted and the separator container is cut away. Separator 10 is located within well 12 near well bottom 14. Separator 10 consists essentially of sealed container 16, water pump 18, heavier liquid pum 20 and sensors 22 and 24. Return probe 26 acts as an electrical circuit return for sensors 22 and 24.

Within sealed container 16, liquid inlet 28 is located near the bottom of container 16 so that it will draw liquid from the lowest part 14 of well 12. Liquid entering through inlet 28 is first drawn through check valve 30, thus assuring that, once in container 16, liquid will not return to the well through inlet 28. Spacers 32 projecting from the bottom of container 16 assure that inlet 28 will not be located flush with the well bottom or in sediment at the well bottom which might block the flow of liquid into container 16.

As liquid is drawn into container 16 it rises in pipe 34 and contacts closed cylindrical baffle 36 which disperses the liquid and deflects the flow downward. It is at this point that the liquid begins to separate. Due to the difference in specific gravities, after being acted upon by baffle 36, the heavier liquid tends to settle to the bottom of container 16, while the lighter liquid, usually water, tends to accumulate above the heavier liquid, that is, nearer the top of container 16.

Liquid flow is then divided into two distinct paths. Water is removed from the upper region of container 16 by water pump 18 whose inlet is at or near the top of container 16. Water pump 18 draws the water through check valve 38 which is additional assurance, beyond the pump action itself, that water will not enter container 16 other than through bottom inlet 28. It should be understood that it is the flow of water out from container 16 through water pump 18 that causes liquid to be drawn into container 16 through inlet 28. Thus, the major flow path is into inlet 28, through check valve 30, pipe 34 and baffle 36, into container 16 and then out through check valve 38, and water pump 18.

A unique aspect of separator 10 is that water pump 18 does not lift the water to the ground surface. Instead, the water is recirculated into well 12 from water pump outlet 40. This yields advantages which were not previously available. For one, the power required to operate water pump 18 is dramatically reduced. Since other conventional systems take all the liquid handled by the removal system up to the ground surface, large quantities of liquid must be pumped against the pressure head created by the depth of the well. The present invention, however, pumps liquid against a very small liquid head, essentially only the length of container 16 plus the length of water pump 18. That pressure head is inconsequential compared to the depth of the typical well.

The second major advantage of the present invention is also a result of leaving the water within the well. It should be apparent that if a large quantity of liquid, including water, is raised to ground surface, it must be accommodated in some way above ground. Invariably, that means equipment to separate the liquids, and transport them, and since the size and expense of liquid handling equipment usually is directly related to the quantity of liquid involved, the water left in the ground dramatically reduces the size and expense of equipment above ground.

The liquid separation action which takes place in the well therefore furnishes unique advantages over the more conventional above ground separators.

As explained above, separator 10 of the present invention uses the difference in specific gravities of the liquids to accumulate the heavier liquid at the bottom of container 16. Moreover, the cross section of container 16 is always smaller than that of well 12 and can be made considerably smaller. This causes the heavier polluting liquid within well 12 to have a greater depth within container 16 than it previously had in well 12, and thereby permits more accurate control of the pumping action for the two liquids.

The polluting liquid is removed from container 16 by heavier liquid pump 20 whose inlet 42 is located within and near the bottom of container 16. Heavier liquid pump 20 therefore draws only the heavier liquid from where it has settled at the bottom of container 16. The heavier liquid then moves through check valve 44, which assures it will not return to container 16, and through pipe 46 into heavier liquid pump 20 from which it is raised to the ground surface through pipe 48.

It is important, however, for the integrity of the separation action, to assure that each pump handles only the liquid for which it was intended. This is accomplished by a control system which uses sensors 22 and 24 to monitor the depth of liquids within container 16.

Sensors 22 and 24 are conventional liquid sensors, for instance, of the type which distinguishes the difference in the electrical conductivity between the two liquids.

Return probe 26 acts as an electrical circuit return for such conductivity sensors, and as one or the other liquid covers sensors 22 and 24, the conductivity between each sensor and return probe 26 changes. This change is interpreted by a conventional control system which then activates either heavier liquid pump 20 or lighter liquid pump 18.

Sensor 24, the lower of the two sensors is located somewhat above inlet 42 of heavier liquid pump 20, and sensor 22 is located above sensor 24 but below the inlet of lighter liquid pump 18. In the preferred embodiment the two pumps are controlled to operate alternately. That is, either heavier liquid pump 20 or lighter liquid pump 18 is always operating, but the two do not operate simultaneously. Thus when upper sensor 22 detects the presence of a heavier liquid, heavier liquid pump 20 is turned on and lighter liquid pump 18 is turned off. Heavier liquid pump 20 then continues to operate until lower sensor 24 detects the presence of a lighter liquid, at which time heavier liquid pump 20 is turned off and lighter liquid pump 18 is turned on.

The interface between water or any other lighter liquid and the polluting heavier liquid therefore continually moves up and down between upper sensor 22 and lower sensor 24. One advantage to the alternate pump mode of operation is that, if the liquids are mixed or agitated as they are drawn into intake 28 of sealed container 16, they will have time to separate before pump 20 begins pumping liquid to the surface.

The present invention therefore provides an effective and economical apparatus for removing a heavier liquid from deep within a well without the need for also pumping large amounts of a lighter liquid such as water from the well.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example lighter liquid pump 18 and heavier liquid pump 20 could be controlled completely independently of one another by appropriate sensors, and the sensors could be of a different type, such as capacitance types. Moreover, the system could use a baffle of a different configuration, and, under some conditions, could function without any baffle. Furthermore, the check valves could be replaced by other unidirectional flow devices.

What is claimed as new and for which Letters Patent of the United States are desired to be secured is:

1. An apparatus for removing a heavier liquid from a well containing water and a heavier liquid, comprising:
    a sealed container located within a well at a location where a heavier liquid than water has accumulated, the sealed container including an inlet which feeds into the container through a unidirectional flow means, with the inlet located so that it is in contact with the heavier liquid in the well;
    a heavier liquid pump interconnected with the sealed container, with its inlet interconnected with the lower region in the sealed container and its outlet interconnected with ground surface above the well;
    a water pump interconnected with the sealed container with its inlet located above the inlet of the heavier liquid pump in the sealed container and with an outlet located within the well so as to discharge the pumped water into the well; and liquid sensing probe means located within the sealed container, interconnected with and controlling the pumps so that the heavier liquid pump stops operating when an interface between the heavier liquid and water approaches its inlet and the water pump stops operating when an interface between the heavier liquid and water approaches its inlet.

2. The apparatus of claim 1 further including a baffle means within the sealed container, interconnected with the sealed container inlet and acting to separate the liquid entering the sealed container.

3. The apparatus of claim 1 further including a unidirectional flow means interconnected with the heavier liquid pump inlet and assuring no liquid will flow out of the heavier liquid pump into the sealed container.

* * * * *